(12) United States Patent
Mullen et al.

(10) Patent No.: US 12,078,239 B2
(45) Date of Patent: Sep. 3, 2024

(54) GEARBOX LUBRICATION SYSTEM FOR AN AIRCRAFT

(71) Applicant: Lockheed Martin Corporation, Bethesda, MD (US)

(72) Inventors: Michael F. Mullen, Cheshire, CT (US); Thomas L. Tully, Box Elder, SD (US); William Wolcott, Burleson, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 17/973,134

(22) Filed: Oct. 25, 2022

(65) Prior Publication Data
US 2024/0133461 A1   Apr. 25, 2024
US 2024/0229922 A9   Jul. 11, 2024

(51) Int. Cl.
*F16H 57/04* (2010.01)

(52) U.S. Cl.
CPC ..... *F16H 57/0435* (2013.01); *F16H 57/0415* (2013.01); *F16H 57/042* (2013.01); *F16H 57/045* (2013.01)

(58) Field of Classification Search
CPC ............. F16H 57/0415; F16H 57/0416; F16H 57/0417; F16H 57/042; F16H 57/0435; F16H 57/0445; F16H 57/045
See application file for complete search history.

(56) References Cited

U.S. PATENT DOCUMENTS

| | | | |
|---|---|---|---|
| 9,683,652 B2 | 6/2017 | Poster | |
| 10,190,672 B2 * | 1/2019 | Ehinger | B64D 35/00 |
| 10,746,284 B2 | 8/2020 | Gmirya et al. | |
| 2012/0227820 A1 | 9/2012 | Poster | |
| 2015/0337946 A1 * | 11/2015 | Koponen | F16H 57/0417 184/6.12 |
| 2016/0123456 A1 | 5/2016 | Goujet | |
| 2019/0154200 A1 | 5/2019 | Glasser et al. | |
| 2020/0340574 A1 | 10/2020 | Sbabo et al. | |

FOREIGN PATENT DOCUMENTS

EP   3104044 A1 * 12/2016   ............. B64D 35/00

* cited by examiner

*Primary Examiner* — Minh Truong
(74) *Attorney, Agent, or Firm* — Michael Best & Friedrich LLP

(57) ABSTRACT

A lubricant system includes a first gearbox defining a first internal cavity, a second gearbox defining a second internal cavity, a first lubricant cooler positioned external the first and second internal cavities, a second lubricant cooler positioned external the first and second internal cavities, and a plurality of fluid passages fluidly connecting the first lubricant cooler and second lubricant coolers to each of the first gearbox and the second gearbox. The first lubricant cooler and the second lubricant cooler are configured to hold lubricant. The fluid passages include a first main fluid passage fluidly connecting the first lubricant cooler to the first gearbox, a second main fluid passage fluidly connecting the second lubricant cooler to the second gearbox, a first auxiliary passage fluidly connecting the first lubricant cooler to the second gearbox, and a second auxiliary passage fluidly connecting the second lubricant cooler to the first gearbox.

20 Claims, 10 Drawing Sheets

GEARBOX LUBRICATION SYSTEM FOR AN AIRCRAFT

FIELD OF INVENTION

Embodiments described herein relate to a gearbox lubrication system for an aircraft.

BACKGROUND

Various rotary aircraft include a propulsion system coupled to a number of blades. In a rotary wing aircraft, the blades or rotors provide lift in addition to forward momentum. In many instances, the blades are connected to the propulsion system through a gearbox. Typically, the gearbox will include a lubrication system that distributes a lubricant onto various components. Loss of lubricant could result in a failure of the gearbox and, ultimately, a loss of momentum and/or lift that may lead to an unplanned landing.

SUMMARY

Embodiments described herein provide a lubricant system including a first gearbox defining a first internal cavity, a second gearbox defining a second internal cavity, a first lubricant cooler positioned external the first and second internal cavities, the first lubricant cooler configured to hold lubricant, a second lubricant cooler positioned external the first and second internal cavities, the second lubricant cooler configured to hold lubricant, and a plurality of fluid passages fluidly connecting the first lubricant cooler and second lubricant coolers to each of the first gearbox and the second gearbox. The fluid passages including a first main fluid passage fluidly connecting the first lubricant cooler to the first gearbox, a second main fluid passage fluidly connecting the second lubricant cooler to the second gearbox, a first auxiliary passage fluidly connecting the first lubricant cooler to the second gearbox, and a second auxiliary passage fluidly connecting the second lubricant cooler to the first gearbox.

In another aspect, embodiments described herein provide a lubricant system including a first gearbox, a second gearbox, a first lubricant cooler defining a first reservoir and a second reservoir that are each configured to hold lubricant, a second lubricant cooler defining a third reservoir and a fourth reservoir that are each configured to hold lubricant, and a plurality of fluid passages fluidly connecting the first lubricant cooler and second lubricant cooler to each of the first gearbox and the second gearbox. The fluid passages including a first main fluid passage fluidly connecting the first lubricant cooler to the first gearbox, a second main fluid passage fluidly connecting the second lubricant cooler to the second gearbox, a first return passage fluidly connecting the first main fluid passage to one of the first reservoir or the second reservoir of the first lubricant cooler, and a second return passage fluidly connecting the first main fluid passage to one of the third reservoir or the fourth reservoir of the second lubricant cooler.

In another aspect, embodiments described herein provide a lubricant system including a first gearbox defining a first internal cavity, a second gearbox defining a second internal cavity, a first lubricant cooler positioned external the first and second internal cavities, the first lubricant cooler configured to hold lubricant, a second lubricant cooler positioned external the first and second internal cavities, the second lubricant cooler configured to hold lubricant, and a plurality of fluid passages fluidly connecting the first lubricant cooler to the first gearbox, the first lubricant cooler to the second gearbox, the second lubricant cooler to the second gearbox, and the second lubricant cooler to the first gearbox. A fault isolating hydraulic control system including a sensor configured to detect an operating characteristic of any one of the first lubricant cooler, the second lubricant cooler, the first gearbox, and the second gearbox, and a valve positioned within one or more of the plurality of fluid passages. An electronic controller in communication with the fault isolating hydraulic control system. The controller operates the lubricant system in a normal operating mode when the operating characteristic of the first lubricant cooler, the second lubricant cooler, the first gearbox, and the second gearbox is within a normal operating range, and the electronic controller operates the lubricant system in an auxiliary operating mode where the valve is activated to adjust one or both of a flow path or a flow rate of the lubricant through the lubricant system when the operating characteristic is outside the normal operating range by a predetermined range Other aspects will become apparent by consideration of the detailed description and accompanying drawings.

DETAILED DESCRIPTION

Before any embodiments are explained in detail, it is to be understood that the embodiments described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items.

A plurality of hardware and software-based devices, as well as a plurality of different structural components, may be used to implement various embodiments. In addition, embodiments may include hardware, software, and electronic components or modules that, for purposes of discussion, may be illustrated and described as if most of the components were implemented solely in hardware. However, one of ordinary skill in the art, and based on a reading of this detailed description, would recognize that, in at least one embodiment, the electronic based aspects of the invention may be implemented in software (for example, stored on a non-transitory computer-readable medium) executable by one or more electronic processors. For example, "control units" and "controllers" described in the specification can include one or more electronic processors, one or more memory modules including non-transitory computer-readable medium, one or more input/output interfaces, one or more application-specific integrated circuits (ASICs), and various connections (for example, a system bus) connecting the various components.

It also should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
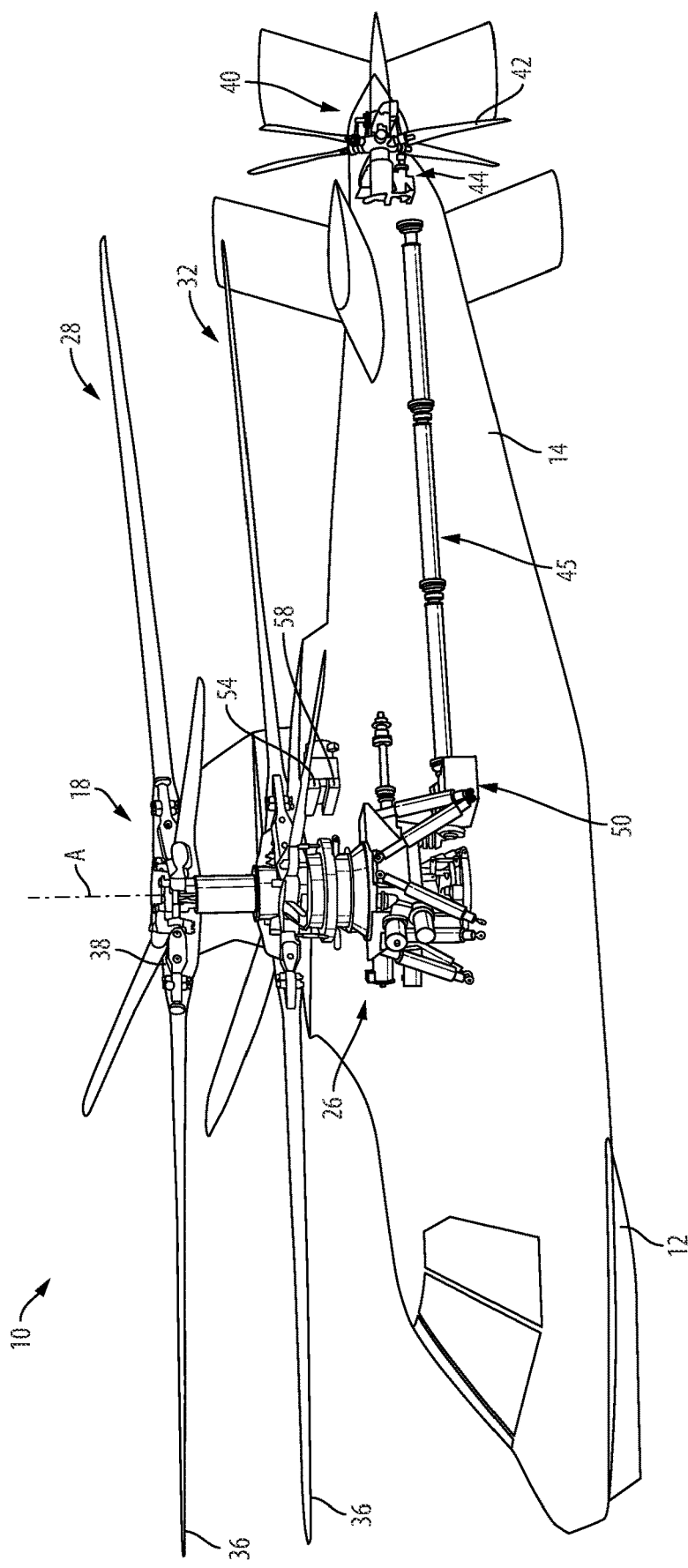
FIG. 1 depicts a rotary wing aircraft according to an exemplary embodiment.

FIG. 1 depicts an embodiment of a rotary wing, vertical takeoff and land (VTOL) aircraft 10. The aircraft 10 includes an airframe 12 with an extending tail 14. A dual, counter-rotating, coaxial main rotor assembly 18 is located at the airframe 12 and rotates about a main rotor axis, A. The main rotor assembly 18 is driven by a power source, for example, one or more engines via a main gearbox 26. In some embodiments, the aircraft 10 further includes a translational thrust system 40 located at the extending tail 14 to provide translational thrust (forward or rearward) for the aircraft 10.

The main rotor assembly 18 includes an upper rotor assembly 28 driven in a first direction (e.g., counter-clockwise) about the main rotor axis, A, and a lower rotor assembly 32 driven in a second direction (e.g., clockwise) about the main rotor axis, A, opposite to the first direction (i.e., counter-rotating rotors). Each of the upper rotor assembly 28 and the lower rotor assembly 32 includes a plurality of rotor blades 36 secured to a rotor hub 38. Any number of blades 36 may be used with the rotor assembly 18. Rotor blades 36 are connected to the upper and lower rotor hubs 38 in a hingeless manner, also referred to as a rigid rotor system. Although a particular aircraft configuration is illustrated in this non-limiting embodiment, other rotary-wing aircraft will also benefit from embodiments. Although the dual rotor system is depicted as coaxial, embodiments include dual rotor aircraft having non-coaxial rotors.

Referring back to FIG. 1, the translational thrust system 40 includes a propeller 42 and an auxiliary or propulsor gearbox 44 operably coupled to the power source by a propulsor drive shaft 46. In the illustrated embodiment, the main gearbox 26 transfers power from the power source to the main rotor assembly 18 and the translational thrust system 40. A portion of the drive system downstream of the main gearbox 26 includes a combined gearbox 50 (also referred to as a propulsor clutch). The combined gearbox 50 selectively operates as a clutch and a brake for the operation of the translational thrust system 40 with the main gearbox 26. Further, the auxiliary gearbox 44 receives the input from the drive shaft 46 to drive the propellers 42. The aircraft 10 also includes one or more heat exchangers or lubricant coolers 54, 58 (described in more detail below) fluidly connected with the main gearbox 26 and the auxiliary gearbox 44 to regulate the temperature of the gearboxes 26, 44. Although a particular aircraft configuration is illustrated in this non-limiting embodiment shown in FIG. 1, other rotary-wing aircrafts will also benefit from embodiments. It should also be appreciated that the aircraft 10 may include more than one auxiliary gearbox to drive alternative drive mechanisms. In such embodiments, the lubricant coolers 54, 58 may be fluidly connected with the additional auxiliary gearboxes.

Figure 2A:
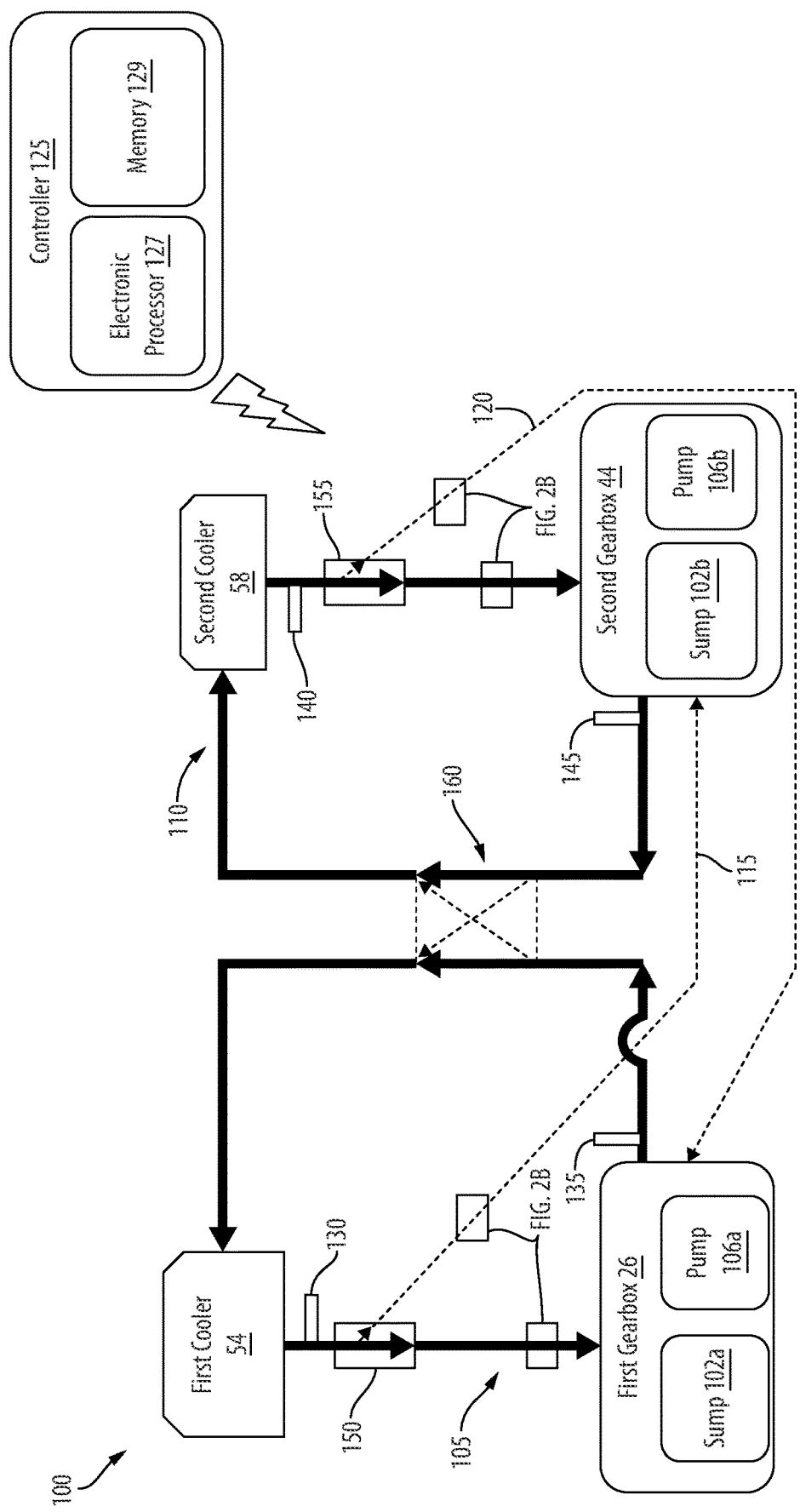
FIG. 2A depicts a schematic view of a lubrication system for the rotary wing aircraft of FIG. 1, illustrating a normal operation mode where a first lubricant cooler and a second lubricant cooler respectively provide lubricant to a first gearbox and a second gearbox.

Now with reference to FIG. 2A, a lubricant system 100 for the rotary wing aircraft 10 is schematically illustrated. The lubricant system 100 includes the main gearbox 26 (referred to hereon as the first gearbox) defining a first internal cavity, the auxiliary gearbox 44 (referred to hereon as the second gearbox) defining a second internal cavity, a first heat exchanger or lubricant cooler 54 positioned external the internal cavities of the gearboxes 26, 44 and having a lubricant supported therein, a second heat exchanger or lubricant cooler 58 positioned external the internal cavities of the gearboxes 26, 44 and having a lubricant supported therein, and a plurality of passages fluidly connecting the lubricant in the first and second lubricant coolers 54, 58 to each of the first and second gearboxes 26, 44. While the illustrated embodiment, includes two lubricant coolers and two gearboxes, it should be appreciated that the lubricant system may include more gearboxes (e.g., three, four, etc.) and/or more lubricant coolers (e.g., three, four, etc.). It should also be appreciated that the lubricant system 100 may be able to provide lubricant to the gearboxes 26, 44 as well as cooling the components of the gearboxes 26, 44. It should be appreciated that the lubricant may be oil, hydraulic fluid, or the like.

In the illustrated embodiment, the first and second gearboxes 26, 44 each include a gearbox sump 102a, 102b fluidly connecting the lubricant coolers 54, 58 and a gearbox pump 106a, 106b. The lubricant may be directed from the gearbox sump 102a, 102b back to the lubricant coolers 54, 58. It should be appreciated that the gearboxes 26, 44 may have a similar construction to the gearbox described in U.S. Pat. No. 10,746,284, which is incorporated herein by reference.

Figure 2B:
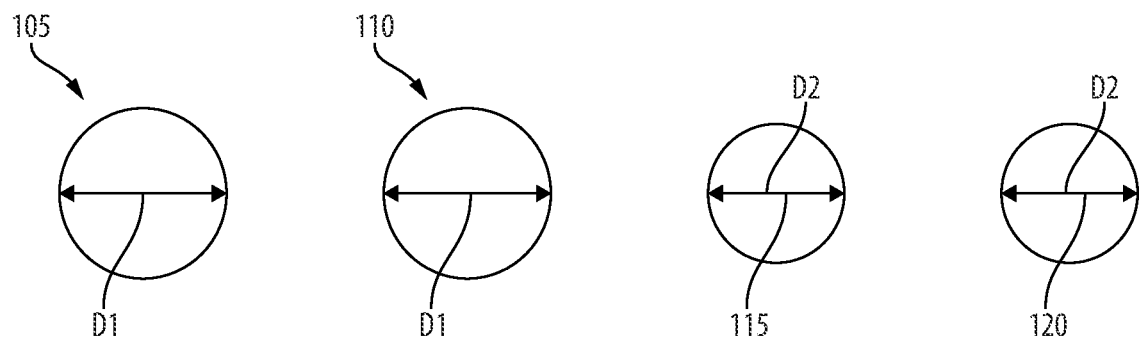
FIG. 2B depicts a schematic cross-sectional view of a main fluid passage and an auxiliary fluid passage of the lubricant system of FIG. 2A.

With continued reference to FIG. 2A, the plurality of passages include a first main fluid passage 105 fluidly connecting the first lubricant cooler 54 to the first gearbox 26, a second main fluid passage 110 fluidly connecting the second lubricant cooler 58 to the second gearbox 44, a first auxiliary passage 115 fluidly connecting the first lubricant cooler 54 to the second gearbox 44 and a second auxiliary passage 120 fluidly connecting the second lubricant cooler 58 to the first gearbox 26. As illustrated in FIG. 2B, the first and second main fluid passages 105, 110 each have a first cross-sectional area (e.g., a first diameter D1) and the first and second auxiliary passages 115, 120 each have a second cross-sectional area (e.g., a second diameter D2) that is smaller than the first cross-sectional area. As such, the flow rate of the lubricant moving through the auxiliary passages 115, 120 is greater than the flow rate of the lubricant moving through the main fluid passages 105, 110. The lubricant system 100 further includes a fault isolating hydraulic control system in communication with one or more of the passages 105, 110, 115, 120, the first and second lubricant coolers 54, 58, and the first and second gearboxes 26, 44, and an electronic controller 125 in communication with the fault isolating hydraulic control system.

The electronic controller 125 includes electrical and electronic components that provide power, operation control, and protection to the components and modules within the electronic controller 125. The electronic controller 125 can include an electronic processor 127 (such as a programmable electronic microprocessor or similar device) that executes software to control the operation of the lubricant system 100. In the example illustrated in FIG. 2A, the electronic controller 125 also includes memory 129 (for example, non-transitory, machine-readable memory, such as, for example, a hard disk, a CD-ROM, an optical storage device, a magnetic storage device, a ROM, a programmable read-only memory (PROM), an EEPROM, an erasable programmable read-only memory (EPROM), and a Flash memory).

The electronic processor 127 is communicatively connected to the memory 129. In some embodiments, the memory 129 stores software executable by the electronic processor 127 to perform the control functionality and associated methods described herein. It should be understood that the electronic controller 125 can include other components, and the configuration illustrated in FIG. 2A is provided as one example.

The fault isolating hydraulic control system includes one or more of sensors 130, 135, 140, 145 (e.g., a pressure sensor, temperature sensor, flow sensor, etc.), and one or more valves 150, 155, 160. The valves 150, 155, 160 may be in electrical communication with the controller 125 and may be able to selectively adjust the flow path of the lubricant and/or the flow rate of the lubricant through the lubricant system 100. For example, the valves 150 may be any combination of flow control valves, flow diverting valves, solenoid valves, other electro-mechanical valves, hydraulic valves or the like. In the illustrated embodiment, the fault isolating hydraulic control system includes a first sensor 130 configured to detect an operating characteristic (e.g., pressure, temperature, flow rate, etc.) of the first lubricant cooler 54, a second sensor 135 configured to detect an operating characteristic of the first gearbox 26, a third sensor 140 configured to detect an operating characteristic of the second lubricant cooler 58, and a fourth sensor 145 configured to detect an operating characteristic of the second gearbox 44. The first and second sensors 130, 135 are therefore in communication with the first main fluid passage 105 and the third and fourth sensors 140, 145 are in communication with the second main fluid passage 110. While the sensors 130, 135, 140, 145 are illustrated downstream the gearboxes 26, 44 and the lubricant coolers 54, 58, it should be appreciated that the sensors 130, 135, 140, 145 may be integrated within the gearboxes 26, 44 and the lubricant coolers 54, 58.

A first valve 150 is in communication with the first main fluid passage 105 and the first auxiliary passage 115 to selectively control the flow path and flow rate of the lubricant from the first lubricant cooler 54. The first valve 150 is positioned downstream of the first lubricant cooler 54 and upstream of the first gearbox 26. A second valve 155 is in communication with the second main fluid passage 110 and the second auxiliary passage 120 to selectively control the flow path and flow rate of the lubricant from the second lubricant cooler 58. The second valve 155 is positioned downstream of the second lubricant cooler 58 and upstream of the second gearbox 44. A third valve 160 is in communication with the first main fluid passage 105 and the second main fluid passage 110 to selectively control the flow path of the lubricant from the first and second gearboxes 26, 44 to the first and second lubricant coolers 54, 58. The third valve 160 is positioned downstream of the first and second gearboxes 26, 44 and upstream of the first and second lubricant coolers 54, 58. In other words, the third valve 160 fluidly connects the first and second main fluid passages 105, 110 to selectively bypass either the first lubricant cooler 54 or the second lubricant cooler 58.

While the illustrated embodiment, includes a specific arrangement of these components of the fault isolating hydraulic control system, it should be appreciated that the fault isolating hydraulic control system may include fewer or more components to adequately detect whether a loss of lubrication scenario occurs within the lubricant system 100.

During operation of the aircraft 10, the controller 125 receives signals from the fault isolating hydraulic control system related to operating characteristics (e.g., pressure, temperature, flow rate, etc.) of the first lubricant cooler 54, the second lubricant cooler 58, the first gearbox 26, the second gearbox 44, and/or the passages 105, 110, 115, 120. The operating characteristics are able to identify areas of lubricant loss in the lubricant system 100. When the operating characteristics are within a predetermined range, the lubricant system 100 transfers the lubricant in a normal operation mode (described below). When the operating characteristics are outside a first or second predetermined range (e.g., pressure is low, temperature is high, etc.), one or more of the sensors 130, 135, 140, 145 sends a signal to controller 125 to activate an auxiliary operating mode (described below). In the auxiliary mode, the controller 125 alters the flow path of the lubricant in the lubricant system to bypass the components where lubricant loss is occurring. The lubricant system 100 allows for the rotary wing aircraft 10 to temporarily continue flight operations in loss of lubrication scenarios where the integrity of one or more of the gearbox sumps 102a, 102b, the lubricant coolers 54, 58, and/or the passages 105, 110, 115, 120 are compromised. The construction of the lubricant system 100 allows the aircraft 10 to operate without the addition of auxiliary lubricant reservoirs and lubricant, lines, pumps, jets, etc. that add weight and do not function until needed.

FIGS. 2A-4 illustrate various operational scenarios of the lubricant system 100. For illustrative purposes, the passages that are depicted in bold line illustrate the flow of the lubricant in the lubricant system 100 and the passages depicted in dashed line illustrate the passages where the flow of lubricant is bypassed. In addition, it should be appreciated that the illustrated scenarios are not exhaustive and other operational scenarios may occur.

FIG. 2A illustrates the lubricant system 100 operating in the normal operating mode when the sensors 130, 135, 140, 145 detect that the components of the lubricant system are within a normal operating range (e.g., the sensors detect adequate pressure and/or temperature in system). In the normal operating mode, lubricant is pumped from the first lubricant cooler 54 to the first gearbox 26 through the first main fluid passage 105. Lubricant is simultaneously pumped from the second lubricant cooler 58 to the second gearbox 44 through the second main fluid passage 110.

Figure 3:
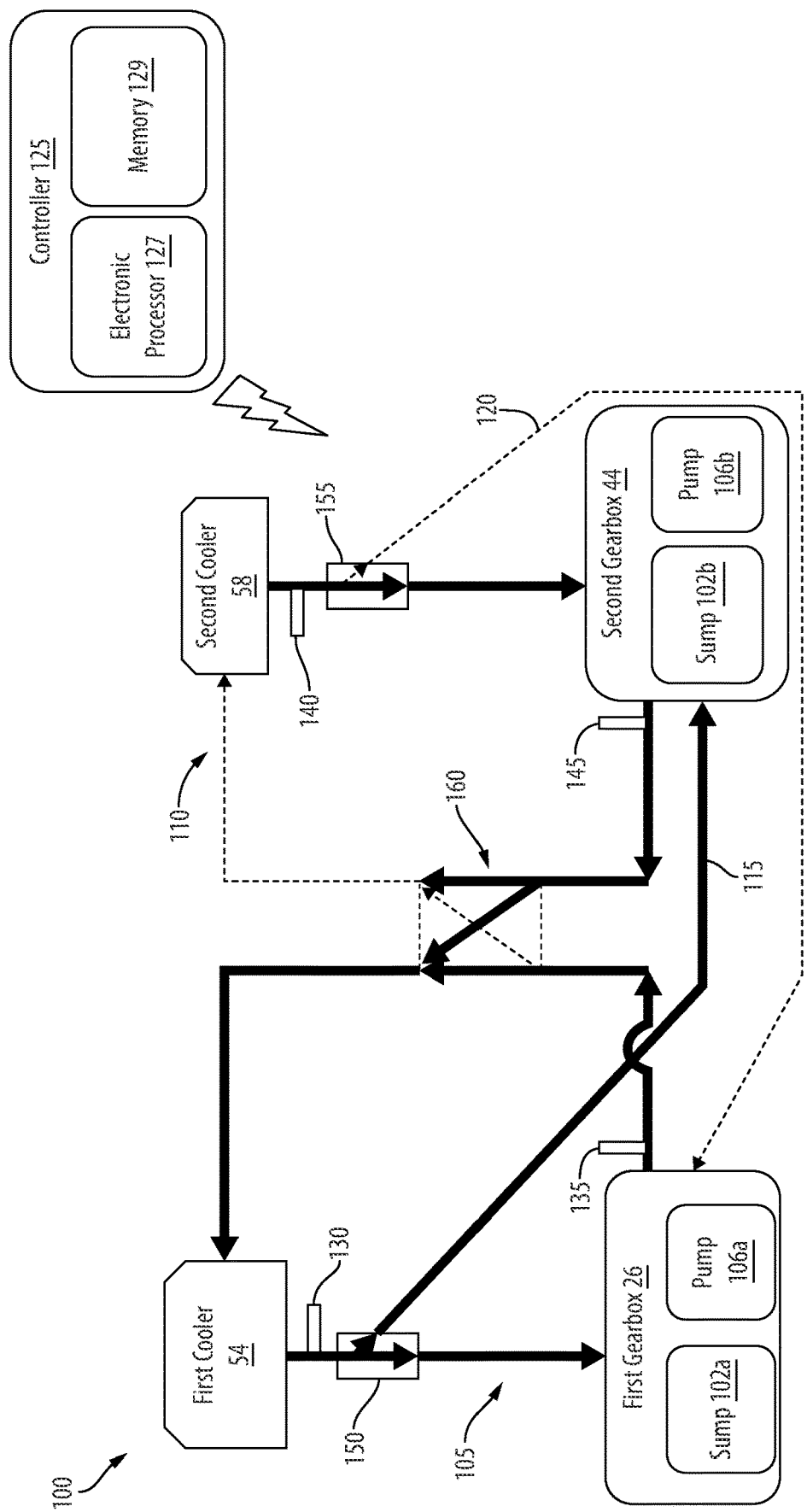
FIG. 3 depicts a schematic view of the lubrication system of FIG. 2A, illustrating a first auxiliary condition where lubricant from the first lubricant cooler is shared between the first and second gearboxes while a second lubricant cooler is bypassed.

FIG. 3 illustrates the lubricant system operating in a first auxiliary mode after the third sensor 140 detects that the operating characteristics of the second lubricant cooler 58 are outside the normal operational range by a first predetermined range (e.g., pressure is low, temperature is high, etc.). The first predetermined range indicates that the component (e.g., the second lubricant cooler 58) is at a critical condition and is no longer viable to use. In the first auxiliary mode, the controller 125 activates the third valve 160 downstream from the second gearbox 44 to fluidly connect the second main fluid passage 110 to the first main fluid passage 105, which thereby bypasses the second lubricant cooler 58. As such, the pump 106b of the second gearbox 44 pumps the lubricant from the sump 102b of the second gearbox 44 to the first lubricant cooler 54. Simultaneously, the controller 125 opens the first valve 150 so the lubricant from the first lubricant cooler 54 flows into the second gearbox 44 through the first auxiliary passage 115. In some embodiments, the first valve 150 may control the flow rate of the lubricant through the first main fluid passage 105 and the first auxiliary passage 115 to evenly disperse the lubricant in the first lubricant cooler 54 to both the first and second gearboxes 26, 44. It should be appreciated that if the sensor 130 detects that the operating characteristics of the first lubricant cooler 54 are outside a predetermined range (e.g., pressure is low, temperature is high, etc.), that the first lubricant cooler 54 may be bypassed in a similar fashion. In this scenario, the pump 106a of the first gearbox 26 pumps the lubricant from the sump 102a of the first gearbox 26 to the second lubricant cooler 58. Further, the second valve 155 is open such that lubricant from the second lubricant cooler 58 flows into the first gearbox 26 through the second auxiliary passage 120.

Figure 4:
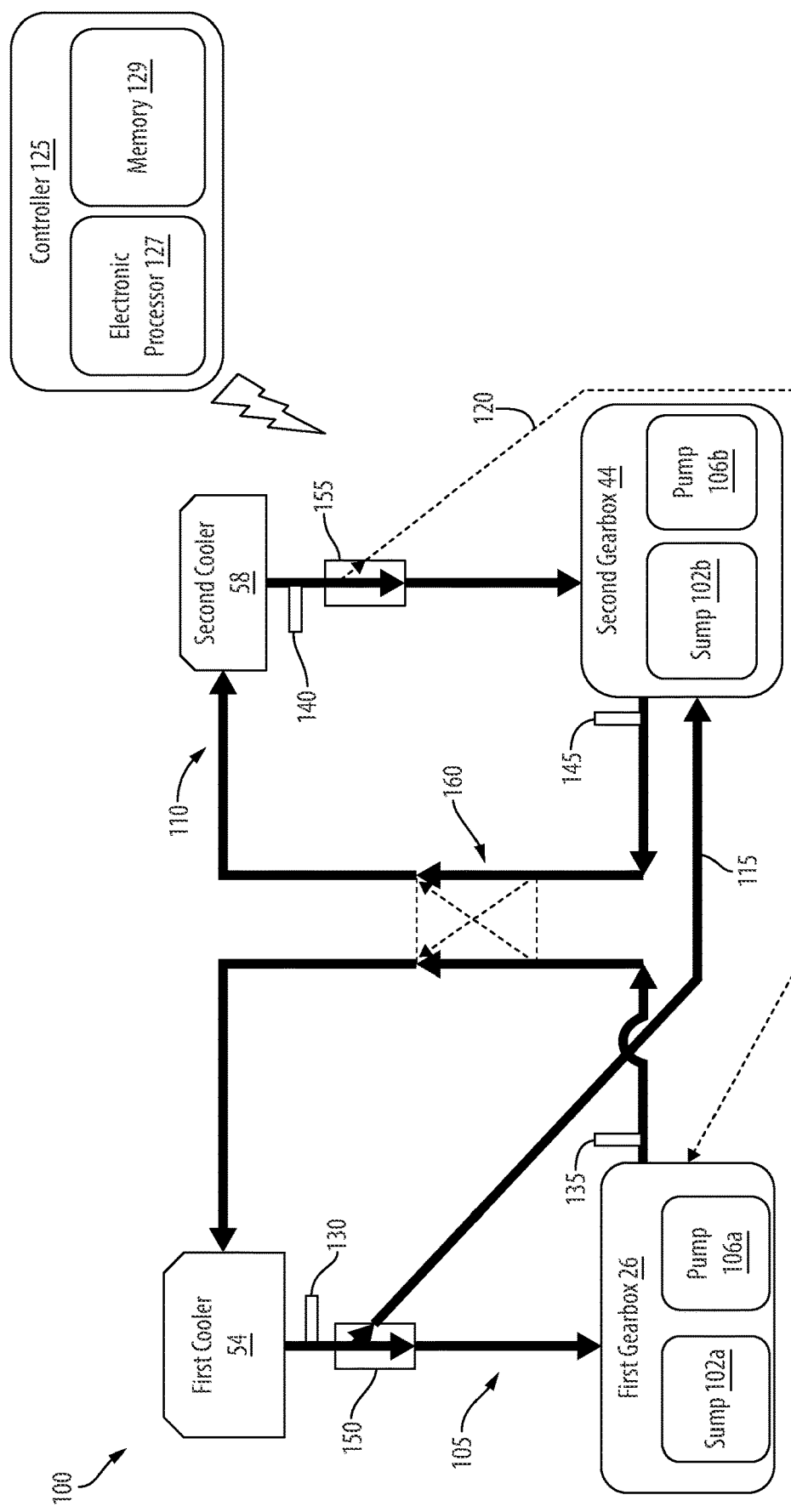
FIG. 4 depicts a schematic view of the lubrication system of FIG. 2A, illustrating a second auxiliary condition where the lubricant is pressurized by the first gearbox and is metered from the first lubricant cooler to the second gearbox.

FIG. 4 illustrates the lubricant system operating in a second auxiliary mode after the fourth sensor 145 detects that the operating characteristics of the second gearbox 44 are outside the normal operational range by a second predetermined range. The second predetermined range indicates that the component (e.g., the second gearbox 44) has not yet reached a critical condition (e.g., where the second gearbox 44 can no longer operate), but is in an adverse condition (e.g., where the second gearbox 44 is functioning at limited capacity). For example, the lubricant pressure in the second gearbox 44 may be above a critical low threshold, but is below a normal acceptable minimum pressure threshold level. In the second auxiliary mode, the controller 125 meters the flow rate through the second valve 155 (i.e., from the second cooler 58 to the second gearbox 44) to prevent excess oil losses in the second gearbox 44 and loss cooling capacity of the lubricant. Metering the flow rate of the lubricant may be defined as adjusting (e.g., increasing or decreasing) the flow rate to a component of the system 100. In the illustrated embodiment, the lubricant flow is decreased through the second valve 155.

Simultaneously, the controller 125 meters lubricant flow through the first auxiliary passage 115 to the second gearbox 44 with the first valve 150. Metering the flow of lubricant from the first lubricant cooler 54 disperses amount of lubricant lost in system 100 between the first lubricant cooler 54 and the second lubricant cooler 58, which increases the amount of time the lubricant system 100 can operate in the second auxiliary mode. In some embodiments, the controller 125 may meter the lubricant to portions of the second gearbox 44 with operating characteristics that are still within the normal operational range. In other words, the metered portion of lubricant is directed to an affected portion of the second gearbox 44 while still allowing metered, but continued, lubricant flow to unaffected portions of the second gearbox 44. The unaffected portions may experience increased operating temperature (e.g., above normal temperatures), but the operating temperature remains below a critical temperature that would quickly cause damage to mechanical load bearing components (bearings, gears, splines, etc.) of the second gearbox 44. It should be appreciated that if the sensor 135 detects that the operating characteristics of the first gearbox 26 are outside the second predetermined range (e.g., pressure is low, temperature is high, etc.), that the controller 125 meters lubricant flow to the first gearbox 26 with the first valve 150. Further, the controller 125 meters lubricant flow through the second auxiliary passage 120 to the first gearbox 26 with the second valve 155. It should be appreciated that scenarios described above are adjusted by the controller 125 and are configured to maintain the gearboxes 26, 44 at a safe operating condition to allow extended flight and avoid unplanned landing. The controller 125 may continuously monitor the sensors 130, 135, 140, 145 and adjust the valves 150, 155, 160 to main safe operating conditions for the components in the primary drive system.

FIGS. 5-9 illustrate a second embodiment of a lubricant system 200, with like components and features as the embodiment of the lubricant system 200 shown in FIG. 2A being labeled with like reference numerals plus "100". The lubricant system 200 is utilized for an aircraft similar to the aircraft 10 of FIG. 1 and, accordingly, the discussion of the aircraft 10 above similarly applies to the lubricant system 200 and is not re-stated. Rather, only differences between the lubricant system 100 of FIGS. 2-4 and the lubricant system 200 of FIGS. 5-9 are specifically noted herein.

The lubricant system 200 includes a first gearbox 126 (e.g., the main gearbox 26) defining a first internal cavity, a second gearbox 144 (e.g., the auxiliary gearbox 44) defining a first internal cavity, a first heat exchanger or lubricant cooler 154 positioned external the internal cavities of the gearboxes 126, 144 and having a lubricant supported therein, a second heat exchanger or lubricant cooler 158 positioned external the internal cavities of the gearboxes 126, 144 and having a lubricant supported therein, and a plurality of passages fluidly connecting the lubricant in the first and second lubricant coolers 154, 158 to each of the first and second gearboxes 126, 144. In the illustrated embodiment, the first lubricant cooler 154 is a bifurcated cooler defining a first reservoir 300 and a second reservoir 305. The second lubricant cooler 158 is also a bifurcated cooler defining a third reservoir 310 and a fourth reservoir 315. While the first and second lubricant coolers 154, 158 are each bifurcated, it should be appreciated that one cooler may be bifurcated and the other may not be bifurcated (e.g., only have a single reservoir).

Figure 5:
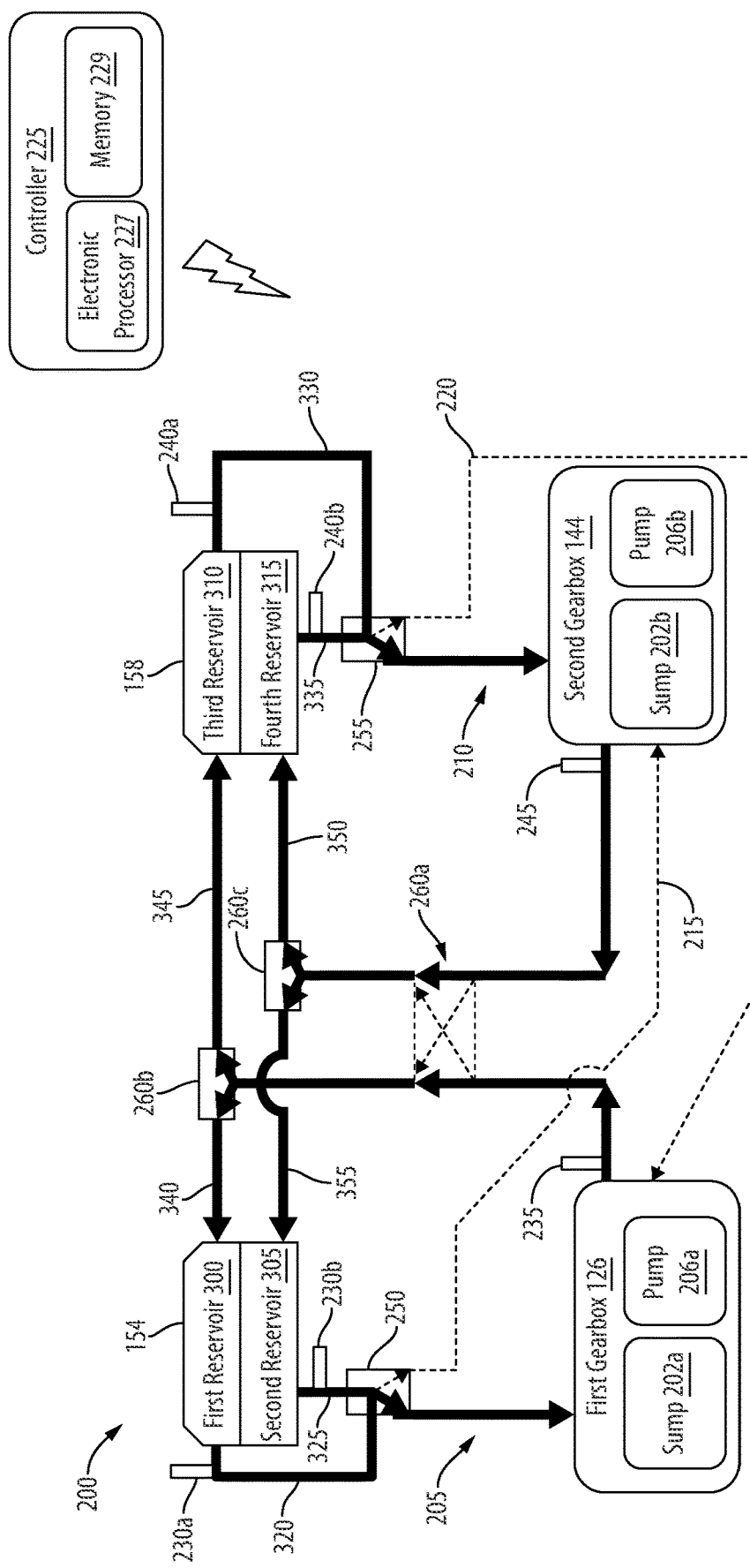
FIG. 5 depicts a schematic view of a lubrication system according to another embodiment for the rotary wing aircraft of FIG. 1, illustrating a normal operation mode where a first bifurcated lubricant cooler and a second bifurcated cooler provide lubricant to a first gearbox and a second gearbox.

With continued reference to FIG. 5, the plurality of passages include a first main fluid passage 205 fluidly connecting the first lubricant cooler 154 to the first gearbox 126, a second main fluid passage 210 fluidly connecting the second lubricant cooler 158 to the second gearbox 144, a first auxiliary passage 215 fluidly connecting the first lubricant cooler 154 to the second gearbox 144 and a second auxiliary passage 220 fluidly connecting the second lubricant cooler 158 to the first gearbox 126. In the illustrated embodiment, a first connecting passage 320 fluidly connects the first reservoir 300 to the first main fluid passage 205 and a second connecting passage 325 fluidly connects the second reservoir 305 to the first main fluid passage 205. Further, a third connecting passage 330 fluidly connects the third reservoir 310 to the second main fluid passage 210 and a fourth connecting passage 335 fluidly connects the fourth reservoir 315 to the second main fluid passage 210.

Downstream from the first gearbox 126, the first main fluid passage 205 splits into a first return passage 340 that returns fluid to the first reservoir 300 of the first lubricant cooler 154 and a second return passage 345 that returns fluid to the third reservoir 310 of the second lubricant cooler 158. Downstream from the second gearbox 144, the second main fluid passage 210 splits into a third return passage 350 that returns fluid to the fourth reservoir 315 of the second lubricant cooler 158 and a fourth return passage 355 that returns fluid to the second reservoir 305 of the first lubricant cooler 154. In other words, the lubricant system 200 splits the returned lubricant from the first and second gearboxes 126, 144 between the first and second lubricant coolers 154, 158.

The lubricant system 200 further includes a fault isolating hydraulic control system in communication with one or more of the passages, the first and second lubricant coolers 154, 158, and the first and second gearboxes 126, 144, and an electronic controller 225 in communication with the fault isolating hydraulic control system. The fault isolating hydraulic control system includes one or more of sensors 230a, 230b, 235, 240a, 240b, 245 (e.g., a pressure sensor, temperature sensor, etc.), one or more valves 250, 255, 260a, 260b, 260c. In the illustrated embodiment, the valves 250, 255, 260a, 260b, 260c are in electrical communication with the controller 125 and able to selectively adjust the flow path of the lubricant and/or the flow rate of the lubricant through the lubricant system 100.

In the illustrated embodiment, fault isolating hydraulic control system includes a first sensor 230a configured to detect an operating characteristic (e.g., pressure, temperature, flow rate, etc.) of the first reservoir 300 of the first lubricant cooler 154, a second sensor 230b configured to detect an operating characteristic of the second reservoir 305 of the first lubricant cooler 154, a third sensor 240a configured to detect an operating characteristic of the third reservoir 310 of the second lubricant cooler 158, a fourth sensor 240b configured to detect an operating characteristic of the fourth reservoir 315 of the second lubricant cooler 158, a fifth sensor 235 configured to detect an operating characteristic of the first gearbox 126, and a sixth sensor 245 configured to detect an operating characteristic of the second gearbox 144.

A first valve 250 fluidly connects the first and second connecting passages 320, 325 to the first main fluid passage 205 and the first auxiliary passage 215 to selectively control the flow path and flow rate of the lubricant from the first lubricant cooler 154. The first valve 250 is positioned downstream of the first lubricant cooler 154 and upstream of the first gearbox 126. A second valve 255 fluidly connects the third and fourth connecting passages 330, 335 to the second main fluid passage 210 and the second auxiliary passage 220 to selectively control the flow path and flow rate of the lubricant from the second lubricant cooler 158. The second valve 255 is positioned downstream of the second lubricant cooler 158 and upstream of the second gearbox 144.

A third valve 260a is in communication with the first main fluid passage 205 and the second main fluid passage 210 to selectively control the flow path of the lubricant from the first and second gearboxes 126, 144 to the first and second lubricant coolers 154, 158. The third valve 260a is positioned downstream of the first and second gearboxes 126, 144 and upstream of the first and second lubricant coolers 154, 158. In other words, the third valve 260a fluidly connects the first and second main fluid passages 205, 210 to selectively bypass either the first lubricant cooler 154 or the second lubricant cooler 158. A fourth valve 260b fluidly connects the first main fluid passage 205 with the first and second return passages 340, 345 to selectively control the flow path of the lubricant from the first gearbox 126 to the first and second lubricant coolers 154, 158. A fifth valve 260c fluidly connects the second main fluid passage 210 with the third and fourth return passages 350, 355 to selectively control the flow path of the lubricant from the second gearbox 144 to the first and second lubricant coolers 154, 158.

FIGS. 5-9 illustrate various operational scenarios of the lubricant system 200. For illustrative purposes, the passages that are depicted in dashed lines illustrate the flow of the lubricant in the lubricant system. In addition, it should be appreciated that the illustrated scenarios are not exhaustive and other operational scenarios may occur.

FIG. 5 illustrates the lubricant system 200 operating in the normal operating mode when the sensors 230a, 230b, 235, 240a, 240b, 245 detect that the components of the lubricant system are within a normal operating range (e.g., the sensors detect adequate pressure and/or temperature in the lubricant system 200). In the normal operating mode, lubricant is pumped from the first and second reservoirs 300, 305 of the first lubricant cooler 154 to the first gearbox 126 through the first main fluid passage 205. Lubricant is simultaneously pumped from the third and fourth reservoirs 310, 315 of the second lubricant cooler 158 to the second gearbox 144 through the second main fluid passage 210. The pump 206a in the first gearbox 126 pumps the lubricant from the sump 202a through the first and second return passages 340, 345 to split the lubricant from the first gearbox 126 between the first reservoir 300 of the first lubricant cooler 154 and the third reservoir 310 of the second lubricant cooler 158. The pump 206b in the second gearbox 144 pumps the lubricant from the sump 202b through the third and fourth return passages 350, 355 to split the lubricant from the second gearbox 144 between the fourth reservoir 315 of the second lubricant cooler 158 and the second reservoir 305 of the first lubricant cooler 154.

Figure 6:
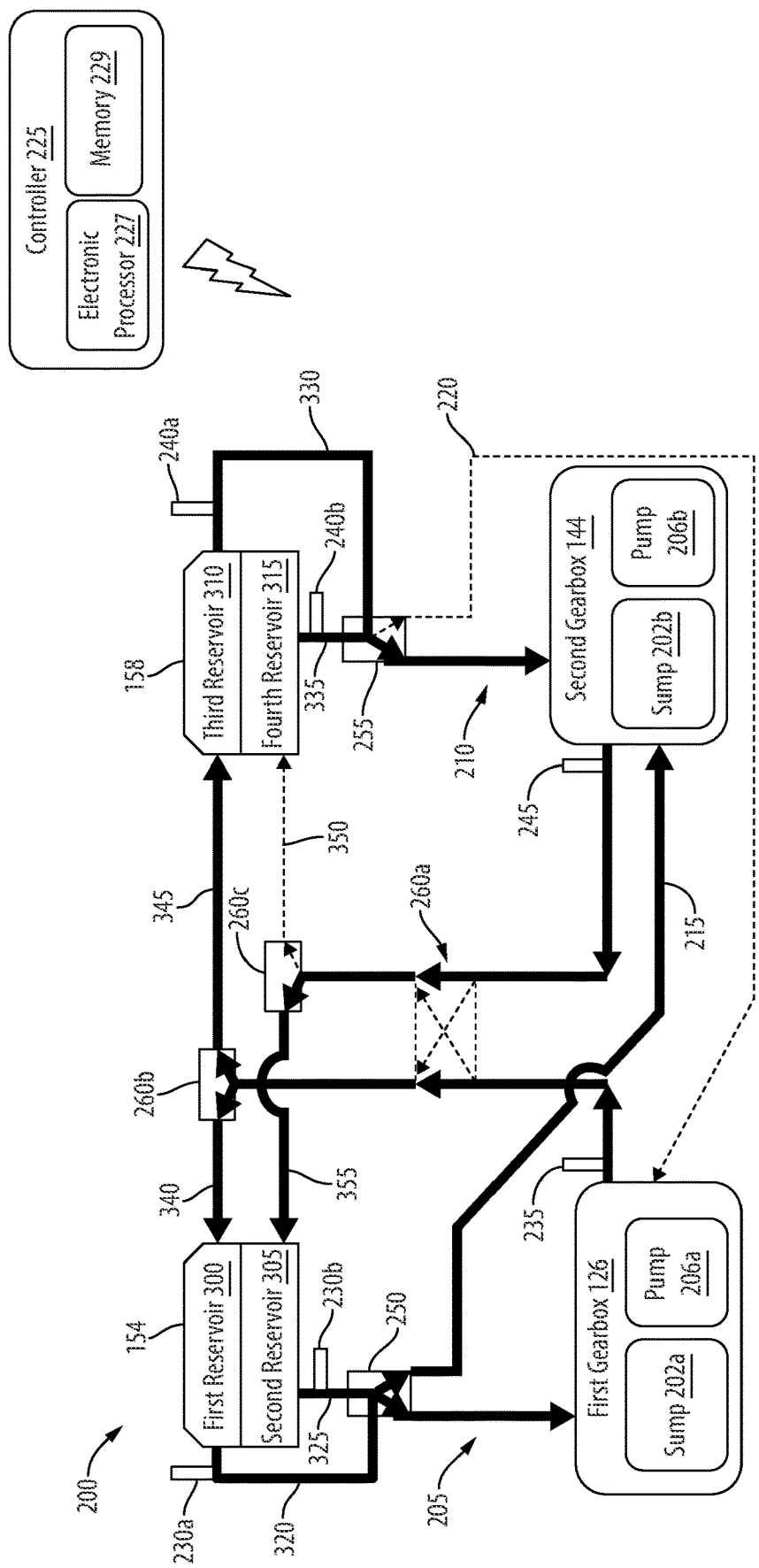
FIG. 6 depicts a schematic view of the lubrication system of FIG. 5, illustrating a first auxiliary condition where a reservoir of the second bifurcated cooler is bypassed.

FIG. 6 illustrates the lubricant system operating in a first auxiliary mode after the fourth sensor 240b detects that the operating characteristics of the fourth reservoir 315 of the second lubricant cooler 158 are outside the normal operational range by a first predetermined range (e.g., pressure is low, temperature is high, etc.). The first predetermined range indicates that the component (e.g., the fourth reservoir 315) is at a critical condition and is no longer viable to use. In the first auxiliary mode, the controller 225 activates the fifth valve 260c to bypass the third return passage 350, and thereby prevent the return of lubricant to the fourth reservoir 315. As such, the pump 206b of the second gearbox 144 pumps the lubricant from the sump 202b of the second gearbox 144 to the second reservoir 305 of the first lubricant cooler 154. Simultaneously, the controller 225 opens the first valve 250 so the lubricant from the first lubricant cooler 154 additionally flows into the second gearbox 144 through the first auxiliary passage 215. It should be appreciated that if any of the sensor 230a, 230b, 240a detects that the operating characteristics of any of the first, second, and third reservoirs 300, 305, 310 are outside the predetermined range (e.g., pressure is low, temperature is high, etc.), that any of the first, second, and third reservoirs 300, 305, 310 may be bypassed in a similar fashion by activating the corresponding valve 260b, 260c to prevent flow to the selected reservoir. In another scenario, the first sensor 230a detects that the operating characteristics of the first reservoir 300 of the first lubricant cooler 154 are outside the normal operational range by the first predetermined range. Further, the controller 225 activates the fourth valve 260b to bypass the first return passage 340, and thereby prevent the return of lubricant to the first reservoir 300. In another scenario, the second sensor 230b detects that the operating characteristics of the second reservoir 305 of the first lubricant cooler 154 are outside the normal operational range by the first predetermined range. Further, the controller 225 activates the fifth valve 260c to bypass the fourth return passage 355, and thereby prevent the return of lubricant to the second reservoir 305. In another scenario, the third sensor 240a detects that the operating characteristics of the third reservoir 310 of the second lubricant cooler 158 are outside the normal operational range by the first predetermined range. Further, the controller 225 activates the fifth valve 260b to bypass the second return passage 345, and thereby prevent the return of lubricant to the third reservoir 310.

Figure 7:
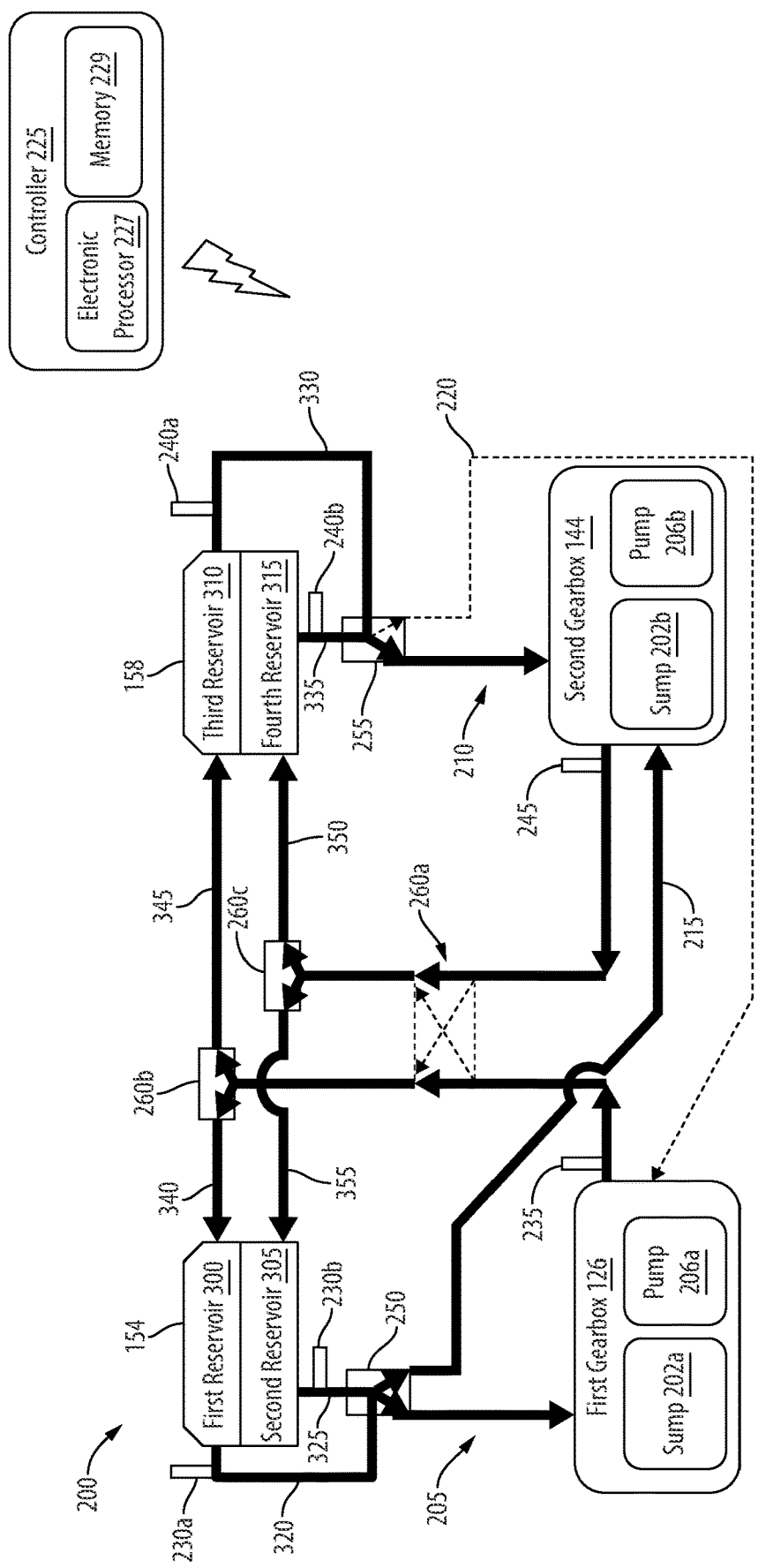
FIG. 7 depicts a schematic view of the lubrication system of FIG. 5, illustrating a second auxiliary condition where the lubricant is pressurized by the first gearbox and is metered from the first and second bifurcated lubricant coolers to the second gearbox.

FIG. 7 illustrates the lubricant system operating in a second auxiliary mode after the sixth sensor 245 detects that the operating characteristics of the second gearbox 144 are outside the normal operational range by a second predetermined range. The second predetermined range indicates that the component (e.g., the second gearbox 144) has not yet reached a critical condition (e.g., where the second gearbox 144 can no longer operate), but is in an adverse condition (e.g., where the second gearbox is functioning at a limited capacity). For example, the lubricant pressure in the second gearbox 144 may be above a critical low threshold, but is below a normal acceptable minimum pressure threshold level. In the second auxiliary mode, the controller 225 meters the flow rate through the second valve 255 to prevent excess oil losses in the second gearbox 144 and loss cooling capacity of the lubricant. Simultaneously, the controller 225 meters lubricant flow through the first auxiliary passage 215 to the second gearbox 144 with the first valve 250. In some embodiments, the controller 225 may meter the lubricant to portions of the second gearbox 144 with operating characteristics that are still within the normal operational range. In other words, the metered portion of lubricant is directed to an affected portion of the second gearbox 144 while still allowing metered, but continued, lubricant flow to unaffected portions of the second gearbox 144. The unaffected portions may experience increased operating temperature (e.g., above normal temperatures), but the operating temperature remains below a critical temperature that would quickly cause damage to mechanical load bearing components (bearings, gears, splines, etc.) of the second gearbox 144. It should be appreciated that if the fifth sensor 235 detects that the operating characteristics of the first gearbox 126 are outside the second predetermined range (e.g., pressure is low, temperature is high, etc.), than the controller 225 meters lubricant flow to the first gearbox 126 with the first valve 250. Further, the controller 225 meters lubricant flow through the second auxiliary passage 220 to the first gearbox 126 with the second valve 255.

Figure 8:
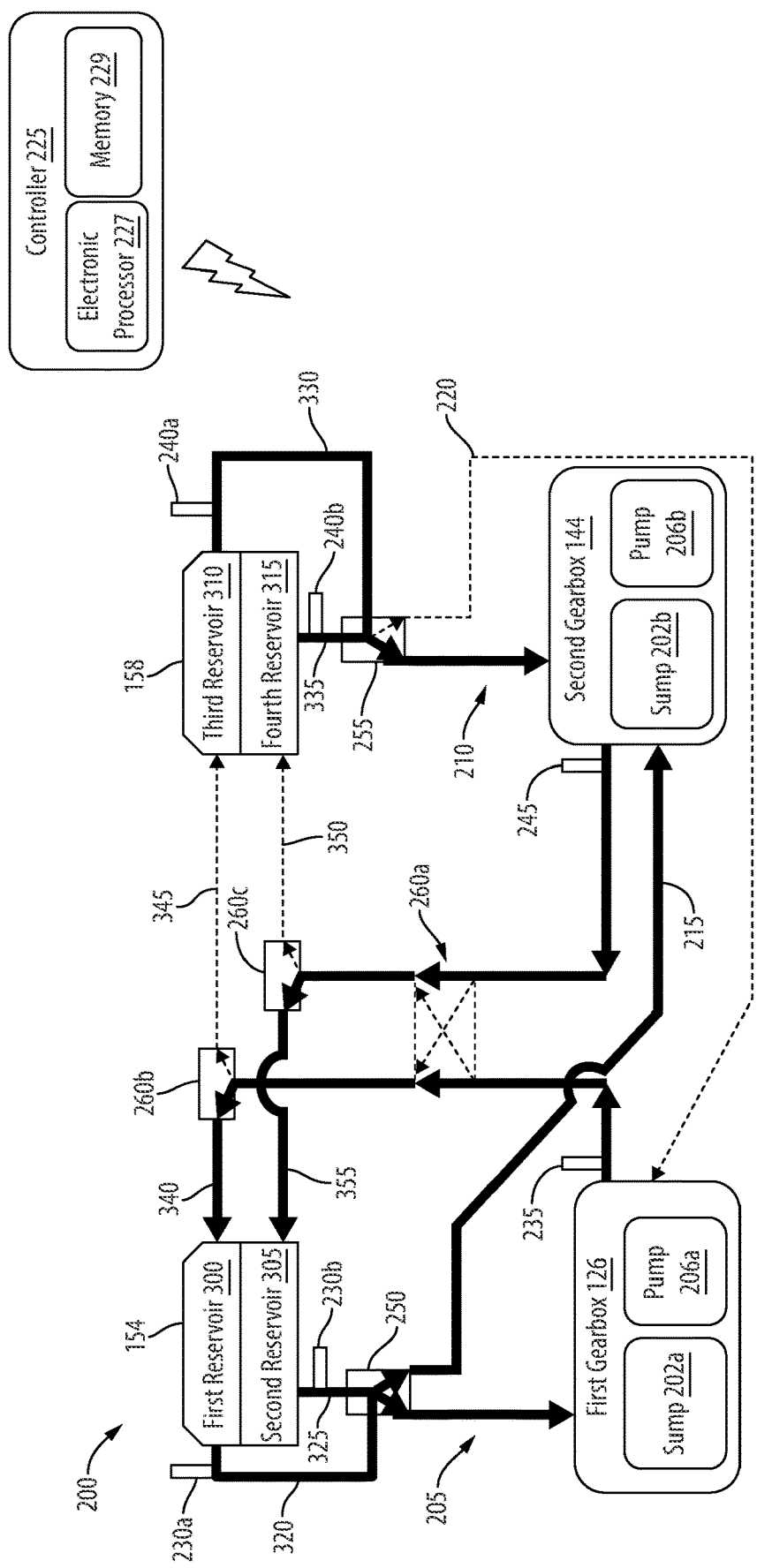
FIG. 8 depicts a schematic view of the lubrication system of FIG. 5, illustrating a third auxiliary condition where both reservoirs of the second bifurcated cooler are bypassed.

FIG. 8 illustrates the lubricant system operating in a third auxiliary mode after the third and fourth sensors 240a, 240b detect that the operating characteristics of both of the third and fourth reservoirs 310 of the second lubricant cooler 158 are outside the normal operational range by the first predetermined range (e.g., pressure is low, temperature is high, etc.). In the third auxiliary mode, the controller 225 activates the fourth and fifth valves 260b, 260c to bypass the second and third return passage 345, 350 and prevent the return of lubricant to the third and fourth reservoirs 310, 315 of the second lubricant cooler 158. As such, the pump 206b of the second gearbox 144 pumps the lubricant from the sump 202b of the second gearbox 144 to the second reservoir 305 of the first lubricant cooler 154. Likewise, the pump 206a of the first gearbox 126 pumps the lubricant from the sump 202a of the first gearbox 126 to the first reservoir 300 of the first lubricant cooler 154. Simultaneously, the controller 225 opens the first valve 250 so the lubricant from the first lubricant cooler 154 flows into the second gearbox 144 through the first auxiliary passage 215. In some embodiments, in the third auxiliary mode, the sixth sensor 245 may detect that the operating characteristics of the second gearbox 144 are outside the normal operational range by a second predetermined range. In addition to the second lubricant cooler 158 being bypassed, the controller 255 meters lubricant to second gearbox (e.g., as described above in the second auxiliary mode).

It should be appreciated that if the first and second sensor 230a, 230b detect that the operating characteristics of the first and second reservoirs 300, 305 are outside the predetermined range (e.g., pressure is low, temperature is high, etc.), that the first and second reservoirs 300, 305 may be bypassed in a similar fashion. In this scenario, the controller 225 activates the fourth and fifth valves 260b, 260c to bypass the first and fourth return passage 340, 355 and prevent the return of lubricant to the first and second reservoirs 300, 305 of the first lubricant cooler 154. As such, the pump 206b of the second gearbox 144 pumps the lubricant from the sump 202b of the second gearbox 144 to the fourth reservoir 315 of the second lubricant cooler 158. Likewise, the pump 206a of the first gearbox 126 pumps the lubricant from the sump 202a of the first gearbox 126 to the third reservoir 310 of the second lubricant cooler 158. Simultaneously, the controller 225 opens the second valve 255 so the lubricant from the second lubricant cooler 158 flows into the first gearbox 126 through the second auxiliary passage 220. In some embodiments, the third sensor 235 may detect that the operating characteristics of the first gearbox 126 are outside the normal operational range by a second predetermined range. In addition to the first lubricant cooler 154 being bypassed, the controller 225 meters lubricant to first gearbox (e.g., as described above in the second auxiliary mode).

Figure 9:
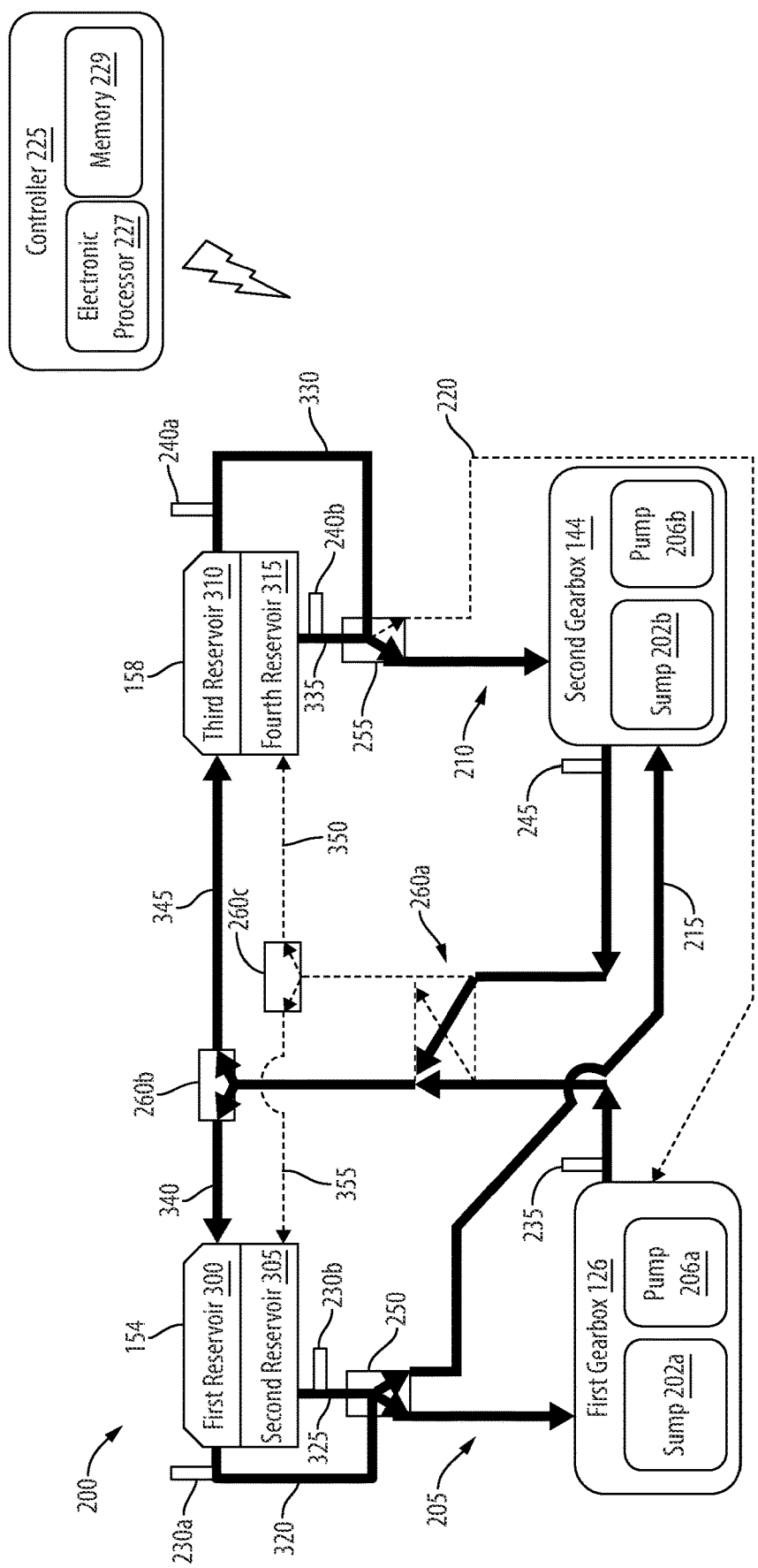
FIG. 9 depicts a schematic view of the lubrication system of FIG. 5, illustrating a fourth auxiliary condition where both reservoirs of the second bifurcated cooler are bypassed and where the lubricant is pressurized by the first gearbox and is metered from the first bifurcated lubricant cooler to the second gearbox.

FIG. 9 illustrates the lubricant system operating in a fourth auxiliary mode after the second and fourth sensors 230b, 240b detect that the operating characteristics of both of the second and fourth reservoirs 305, 315 are outside the normal operational range by the first predetermined range (e.g., pressure is low, temperature is high, etc.). In the fourth auxiliary mode, the controller 225 activates the third valve 260a to bypass the third and fourth return passage 350, 355 to fluidly connect the second main fluid passage 210 to the first main fluid passage 205. Thus, activation of the third valve 260a prevents the return of lubricant to the second and fourth reservoirs 305, 315. In some embodiments, the first and third sensors 230a, 240a may detect that the operating characteristics of both the first and third fluid reservoirs 300, 310 are outside the normal operational range by the first predetermined range. Thus, the controller 225 activates the third valve 260a to bypass the first and second return passage 340, 345 to fluidly connect the first main fluid passage 205 to the second main fluid passage 210. Thus, activation of the third valve 260a prevents the return of lubricant to the first and third reservoirs 300, 310.

Various features and advantages of the embodiments described herein are set forth in the following claims.

What is claimed is:

1. A lubricant system comprising:
a first gearbox defining a first internal cavity;
a second gearbox defining a second internal cavity;
a first lubricant cooler positioned external the first and second internal cavities, the first lubricant cooler configured to hold lubricant;
a second lubricant cooler positioned external the first and second internal cavities, the second lubricant cooler configured to hold lubricant; and
a plurality of fluid passages fluidly connecting the first lubricant cooler and second lubricant coolers to each of the first gearbox and the second gearbox, the fluid passages including
a first main fluid passage fluidly connecting the first lubricant cooler to the first gearbox;
a second main fluid passage fluidly connecting the second lubricant cooler to the second gearbox;
a first auxiliary passage fluidly connecting the first lubricant cooler to the second gearbox;
a second auxiliary passage fluidly connecting the second lubricant cooler to the first gearbox; and
a first valve fluidly connecting the first main fluid passage and the first auxiliary passage, the first valve configured to selectively control the flow path of lubricant from the first lubricant cooler to the first main fluid passage and the first auxiliary passage,
wherein the first main fluid passage splits into a first return passage fluidly connecting the first main fluid passage to the first lubricant cooler and a second return passage fluidly connecting the first main fluid passage to the second lubricant cooler.

2. The lubricant system of claim 1, further comprising a fault isolating hydraulic control system including
a sensor configured to detect an operating characteristic of any one of the first lubricant cooler, the second lubricant cooler, the first gearbox, and the second gearbox, and
wherein an electronic controller is in communication with the fault isolating hydraulic control system and configured to activate the first or second valve to adjust one or both of a flow path or a flow rate of the lubricant through the lubricant system.

3. The lubricant system of claim 2, wherein the operating characteristic is a pressure or temperature of the one or more of the first lubricant cooler, the second lubricant cooler, the first gearbox, and the second gearbox.

4. The lubricant system of claim 2, wherein the controller operates the lubricant system in a normal operating mode where lubricant flows through the first and second main fluid passages when the operating characteristic of the first lubricant cooler, the second lubricant cooler, the first gearbox, and the second gearbox is within a normal operating range.

5. The lubricant system of claim 4, wherein the controller operates the lubricant system in an auxiliary operating mode where the controller activates the first valve to fluidly connect the first main fluid passage to the first auxiliary passage to bypass the first lubricant cooler when the operating characteristic of the first lubricant cooler is outside the normal operating range by a predetermined range.

6. The lubricant system of claim 5, further comprising a second valve connecting the second main fluid passage and the second auxiliary passage, wherein the second valve is configured to selectively control the flow path of lubricant from the second lubricant cooler to the second main fluid passage or the second auxiliary passage, and wherein the controller activates the second valve to direct the lubricant flow through the second auxiliary passage in the auxiliary operating mode.

7. The lubricant system of claim 4, wherein the controller operates the lubricant system in an auxiliary operating mode where the flow rate of the lubricant is metered through the first valve to the first gearbox or the second valve to the second gearbox when the operating characteristic of one or more of the first gearbox and the second gearbox are outside the normal operational range by a predetermined range.

8. The lubricant system of claim 7, wherein the lubricant system operates in the auxiliary operating mode when the one or more of the first gearbox and the second gearbox are operating in an adverse condition.

9. A lubricant system comprising:
a first gearbox;
a second gearbox;
a first lubricant cooler defining a first reservoir and a second reservoir that are each configured to hold lubricant;
a second lubricant cooler defining a third reservoir and a fourth reservoir that are each configured to hold lubricant; and
a plurality of fluid passages fluidly connecting the first lubricant cooler and second lubricant cooler to each of the first gearbox and the second gearbox, the fluid passages including
a first main fluid passage fluidly connecting the first lubricant cooler to the first gearbox;
a second main fluid passage fluidly connecting the second lubricant cooler to the second gearbox;
wherein the first main fluid passage splits into a first return passage fluidly connecting the first main fluid passage to the first reservoir of the first lubricant cooler and a second return passage fluidly connecting the first main fluid passage to the third reservoir of the second lubricant cooler,
wherein the first return passage is downstream the first gearbox and upstream the first reservoir,
wherein the second return passage is downstream the first gearbox and upstream the third reservoir.

10. The lubricant system of claim 9, wherein the second main fluid passage splits into a third return passage fluidly connecting the second main fluid passage to the fourth reservoir of the second lubricant cooler and a fourth return passage fluidly connecting the second main fluid passage to the second reservoir of the first lubricant cooler.

11. The lubricant system of claim 9, further comprising a fault isolating hydraulic control system including
a sensor configured to detect an operating characteristic of one or more of the first reservoir, the second reservoir, the third reservoir, the fourth reservoir, the first gearbox, and the second gearbox, and
a valve positioned within one or more of the plurality of fluid passages, and
wherein an electronic controller is in communication with the fault isolating hydraulic control system and configured to activate the valve to adjust one or both of a flow path and a flow rate of the lubricant through the lubricant system.

12. The lubricant system of claim 11, wherein the operating characteristic is a pressure or temperature of the one or more of the first lubricant cooler, the second lubricant cooler, the first gearbox, and the second gearbox.

13. The lubricant system of claim 11, wherein the valve fluidly connects the first main fluid passage to the first return passage, and wherein the controller operates the lubricant system in an auxiliary operating mode where the valve is activated to bypass the first return passage or the second return passage when the operating characteristic of one of the first, second, third, or fourth reservoirs is outside a normal operational range by a predetermined range.

14. The lubricant system of claim 11, wherein the valve is in fluid communication with the first main fluid passage and is positioned downstream the first gearbox and the second gearbox, and wherein the controller operates the lubricant system in an auxiliary operating mode where the controller activates the valve to fluidly connect the first and second main fluid passages to bypass the first lubricant cooler or the second lubricant cooler when the operating characteristic of the first reservoir and the second reservoir or the third reservoir and the fourth reservoir are outside a normal operational range by a predetermined range.

15. The lubricant system of claim 11, wherein the valve is a first valve positioned downstream the first lubricant cooler or the second lubricant cooler, and wherein the controller operates the lubricant system in an auxiliary operating mode where the flow rate of the lubricant is metered through the valve to one or more of the first gearbox and the second gearbox when the operating characteristic of one or more of the first gearbox and the second gearbox are outside the normal operational range by a predetermined range.

16. The lubricant system of claim 15, further comprising a first auxiliary passage fluidly connecting the first lubricant cooler to the second gearbox; and
a second auxiliary passage fluidly connecting the second lubricant cooler to the first gearbox,
wherein the controller activates the valve to direct the lubricant flow through the first auxiliary passage or the second auxiliary passage in the auxiliary operating mode.

17. A lubricant system comprising:
a first gearbox defining a first internal cavity;
a second gearbox defining a second internal cavity;
a first lubricant cooler positioned external the first and second internal cavities, the first lubricant cooler configured to hold lubricant;
a second lubricant cooler positioned external the first and second internal cavities, the second lubricant cooler configured to hold lubricant;
a plurality of fluid passages fluidly connecting the first lubricant cooler to the first gearbox, the first lubricant cooler to the second gearbox, the second lubricant cooler to the second gearbox, and the second lubricant cooler to the first gearbox, the plurality of fluid passages having a first main fluid passage that splits into a first return passage fluidly connecting the first main fluid passage to the first lubricant cooler and a second return passage fluidly connecting the first main fluid passage to the second lubricant;
a fault isolating hydraulic control system including
a sensor configured to detect an operating characteristic of any one of the first lubricant cooler, the second lubricant cooler, the first gearbox, and the second gearbox, and
a valve fluidly connecting the first main fluid passage with the first return passage and the second return passage at a position downstream the first gearbox and upstream the first lubricant cooler and the second lubricant cooler, and
an electronic controller in communication with the fault isolating hydraulic control system,
wherein the controller operates the lubricant system in a normal operating mode when the operating characteristic of the first lubricant cooler, the second lubricant cooler, the first gearbox, and the second gearbox is within a normal operating range, and
wherein the electronic controller operates the lubricant system in an auxiliary operating mode where the valve is activated to adjust one or both of a flow path or a flow rate of the lubricant to the first lubricant cooler and the second lubricant cooler when the operating characteristic is outside the normal operating range by a predetermined range.

18. The lubricant system of claim 17, wherein the operating characteristic is a pressure or temperature of the one or more of the first lubricant cooler, the second lubricant cooler, the first gearbox, and the second gearbox.

19. The lubricant system of claim 17, wherein the controller activates the valve to bypass one of the first lubricant cooler or the second lubricant cooler when the operating characteristic of one or more of the first lubricant cooler and the second lubricant cooler are outside the normal operational range by the predetermined range.

20. The lubricant system of claim 17, wherein the controller activates the valve to meter the lubricant to one or more of the first gearbox or the second gearbox when the operating characteristic of one or more of the first gearbox, and the second gearbox are outside the normal operational range by the predetermined range.

* * * * *